Figure 1A:
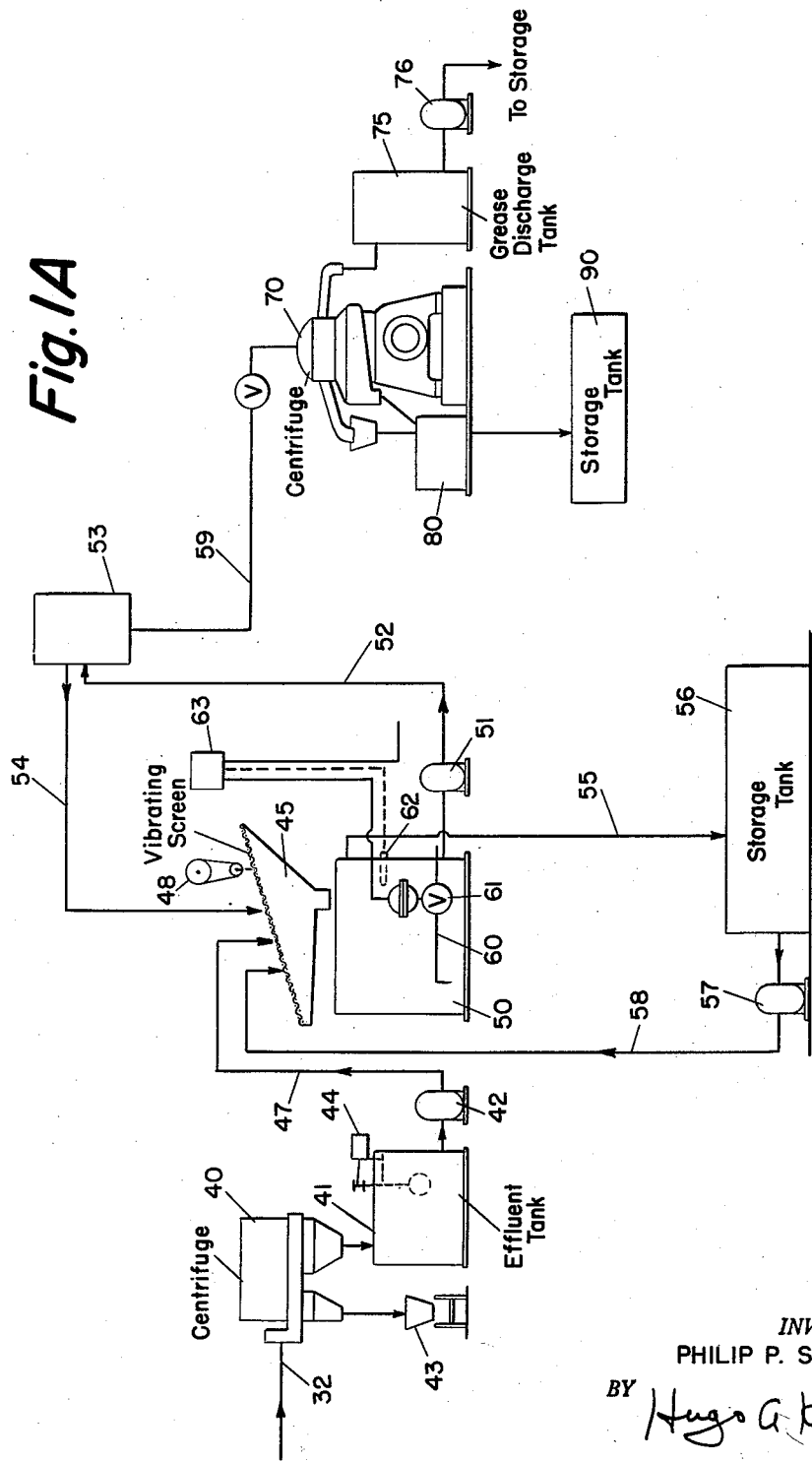

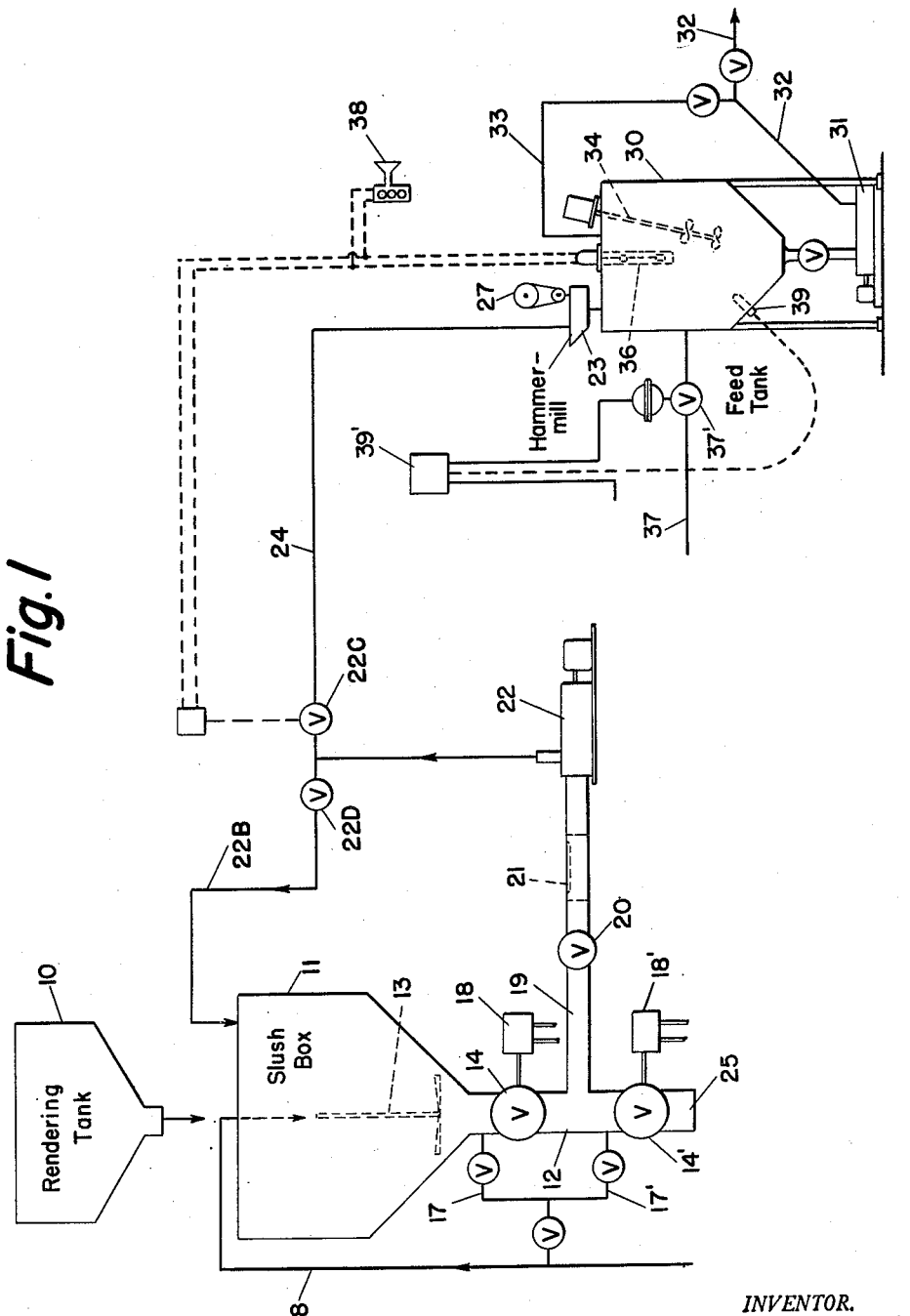

2,823,214

PROCESS FOR RECOVERING SOLIDS, FATS, AND TANKWATER

Philip P. Sharples, Bryn Mawr, Pa., assignor to The Sharples Corporation, a corporation of Delaware Application July 27, 1950, Serial No. 176,163

3 Claims. (Cl. 260—412.6)

This invention relates to a process and apparatus for recovering protein in the form of meal cake, and grease or fats from tankwater and tankage resulting from the rendering of hog, beef and other animal wastes.

The by-product recovery in the meat packing industry presents serious economic and technical problems when it is considered that only about 60% of a hog can be sold as prime edible products for more per pound than it costs on the hoof. The remaining 40% must be sold at a loss or thrown away. An exactly similar situation exists with beef.

The 40% of waste hog previously referred to is disposed of in two general categories. The first is as fat, edible and inedible. The second is inedible meat meal or digestor tankage, a mixture of cooked blood, meat scraps and bones which is dried and sold on a 60% protein basis. The edible fats are made into lard and other cooking fats and shortenings; the inedible fats are used in soap manufacture, etc.; the meat meal is blended with grain or fodder and fed to animals.

In order to sell the fats and meat meal, they must first be separated from each other. Fat must be obtained in its purest and freshest form to make lard. Meat meal must be obtained with at the most 6% fat in it for animal feeding, since much more fat than this is bad for the animals. This separation is achieved by rendering.

Wet rendering (where the product is cooked in a pressure vessel in water by the introduction of live steam) is the oldest system in use. Dry rendering (where the product is cooked in a steam jacketed melter under partial vacuum, and all the moisture is drawn off rapidly) is a more recent development which had its origin about 25 years ago. The yield of fat in the two methods is about the same. Dry rendering has a much higher initial cost of installation than wet rendering, and in the case of edible fats produces a somewhat stronger smelling and tasting product of darker color and less stability than wet rendering. However, the yield of protein from this process is much higher than with the other. Wet rendering on the other hand is cheaper to install, makes a much more acceptable edible product than dry rendering, but has the disadvantage of rather high loss of protein (approximately 40% loss, as compared with the dry process).

Nearly all edible pork fat is at present wet rendered. Much inedible pork fat is also wet rendered, and some inedible beef fat. The majority of beef, however, is dry rendered, since there is practically no edible beef fat or edible tallow, as it is called, being made in the United States at the present time. This is because the difference in price between edible and inedible tallow at present is so small that it is unprofitable to take the extra trouble. Some inedible pork is also dry rendered.

In the case of dry rendering, the handling after the rendering operation is reasonably simple. The fat is poured off, filtered, and sold. The cracklings are either pressed in a hydraulic press or an expeller, or extracted in a solvent extraction plant. Grease extracted by any of these methods can either be kept separate or added back into the main bulk of fat previously drained off.

The conventional wet rendering process can be broken down into three phases: rendering, pressing, and tankwater handling. The purpose of the press is to separate the tankage solids from the water and grease, and to do it leaving as little water and grease in the solids as possible, and as few insoluble solids in the water-grease phase as possible. The water and grease are subsequently separated by a suitable centrifuge.

Edible and inedible wet rendering are generally carried out separately in different parts of the packing house, but they are very similar processes. The rendering tanks are large, cone-bottom tanks. In accordance with most sanitation regulations, it is necessary for the edible and inedible rendering operations to take place in entirely separate parts of the tankhouse. The slush boxes into which the tankage and tank water from these renderers are dumped are segregated in the same way. The pipes from the bottoms of the slush boxes, however, all lead to the press room, and from then on all tankage, whether from edible or inedible rendering, is handled by the same press and in combination.

The tanks are normally charged with about 10,000 pounds of material to be rendered. In the case of lard, the charge will be nothing but slabs of fat, but the inedible tanks will receive meat scraps, bones, fat chunks, and even whole condemned animals. Live steam is turned into the tanks and the pressure is built up to approximately 65 pounds. After a cook of from 1½ hours to 4 hours, the steam is turned off, and the pressure is gradually released. Too rapid release of pressure will cause the contents to boil and the resultant vigorous agitation will cause the already separated fat to form an emulsion with the water which is hard to handle. The venting and settling time may last from 4 to 8 hours, depending entirely on conditions of operation.

After settling, there will be four layers in the tank: clear fat on top, an interface layer several inches thick containing emulsified protein, water and fat; a layer of tankwater; and a layer of solids. The fat is removed from the top by decanting through a pipe. The interface layer is decanted next. After this, the pressure is built back up inside the tank, and the remaining contents of the tank are blown by this pressure usually through a 12" line into a 5,000 gallon pyramid-bottomed settling tank called a "slush box." According to conventional practices, settling takes place for from 4 to 24 hours (usually the latter) during which time grease floats to the top and is skimmed off. At the end of this settling time the remaining water is run off, and the solids are dropped from the bottom of the tank into press cloths preparatory to hydraulic pressing. Fat and water squeezed out in the press joins the other tankwater removed earlier and is generally stored for further treatment. Some small plants just throw it away, in spite of its high protein value. Other plants evaporate it to 65% total solids, which product is then called "stick liquor" or just "stick." Before evaporation, it is essential to remove the fat from the tank water, both because it makes evaporation difficult, and because it is undesirable in the stick which will be eventually added back to the press solids during drying.

The solids from the press, containing about 45% moisture and about 10% fat on a dry basis, are dumped directly into a dryer with about ⅓ stick and about ⅓ cooked blood. This mixture is dried to about 6% moisture, and is sold to feed manufacturers and farmers as "digestor tankage."

Even though the wet rendering process is more advantageous in some ways than the dry rendering process, it still has many severe shortcomings. The tanks take up considerable space and waste a great deal of heat. They waste time and lose protein in cooking. Pressing is expensive both in labor and maintenance, and the holding periods involved for grease separation cause considerable protein losses. These holding periods also allow putrefaction, which causes the odor around the tankhouse. Press operations are particularly objectionable as the tankage is splashed and squirted around indiscriminately, causing miserable working conditions. Many by-products cannot be run through the presses at all due to their fluid nature, and must be thrown in the sewer. In addition to the loss of protein thrown directly into the sewer, the overall loss of the protein put into the rendering tank, due to decomposition during the long hours of cooking, settling, pressing, evaporating, and storing, amounts to around 40% and in some cases more.

According to this invention, a largely automatic and entirely closed system is provided for continuously treating the tankage slush or slurry resulting after the completion of rendering, and after the grease has been removed from the rendering tank, and the remaining tankage and water have been fed or blown into the slush box. In accordance with this invention, the mixture of tankwater and tankage is continuously fed at controlled temperature and rate of flow. The solids in the tankage are disintegrated or broken down by the process to a substantially uniform particle size so that the resulting slurry can be easily and efficiently handled by the system and so that more complete recovery of the fats is possible. It has been discovered to be important to keep the particle size below ¼ inch mean diameter as will be more fully discussed later. The solids are separated from the fat and water by means of a high centrifugal force continuous solids discharge centrifuge. The total time involved in processing tankage is reduced from 20 to 30 hours previously required to about 20 to 30 minutes whereby major protein losses and decomposition are avoided.

According to this invention the tankage slurry is kept constantly in motion in the slush box. At this point exceptionally large bones and unusual foreign objects may be removed from the system. The material then passes through a magnetic separator, where most of the entrained ferrous metal is trapped. A special pump which is continuously circulating the contents of the slush box from the bottom around to the top also forces the tankage slurry in controlled amounts to a mill which thoroughly disintegrates the material. This breaking up process is further carried on in a steam jacketed tank which is vigorously agitated to prevent settling. Temperature is maintained at over 180° F. and not exceeding 212° F. in this tank which is equipped with both automatic temperature control and automatic liquid level indication and control. A second special pump then feeds the hot tankage, which has now been reduced to small particles of predetermined size into a suitable centrifuge, such as a continuous solids discharge horizontal type centrifuge, which continuously discharges meal cake to the dryer cart or conveyor. The meal is in proper condition for mixing or drying. The remaining liquid is continuously discharged out the other side of the centrifuge into a receiving tank from which it is pumped over a shaker screen for removal of floating particles and agglomerates. With most of the insoluble solids removed, the liquid now flows to a re-heat tank where a temperature of about 205° F. to about 210° F. is maintained at all times. In this temperature range, the grease is readily separated from the tankwater by means of a suitable centrifuge, such as a continuous, three-phase nozzle discharge centrifuge having nozzles around the edge of the bowl, which makes it possible to handle continuously and efficiently two phase separation of liquids containing a relatively small amount of fine solids. The grease which is removed at this point is lower in free fatty acid than that obtained by conventional means, and low in moisture content. The tankwater is rich in available protein and is low in fat content.

Further details and advantages of this invention will be apparent from the appended flow chart shown in Figs. 1 and 1A.

In operating the system as shown in the drawings, the slush box 11 is first filled with several hundred gallons of tankwater and the whole system is then started into operation. For this purpose, the contents of several rendering tanks, such as rendering tank 10, may be fed into the slush box 11 at once, and immediately the slurry of water and solids begin to undergo treatment. Agitation of the slurry is maintained at all times in the slush box to prevent the immediate settling of solids which would otherwise occur. Air is supplied by air line 8 to air jets in an agitation header 13 so placed and directed as to keep the contents of the slush box spiraling and turning over. Also air coming up through the outlet at the bottom of the tank prevents bones and other solids from settling out at this point. In addition, circulation of the slurry by the pump 22 through line 22B at 200 to 400 G. P. M. greatly aids in holding the solids in suspension.

A refuse trapping device is installed at the bottom of slush box 11 from which, in actual practice, several hundred pounds of rags, large bones and metal may be frequently removed in a day's operation. The opening at the bottom of the slush box is preferably about 12" in diameter, and to it is affixed a power operated double-valve cylinder 12. The upper and lower ends of the cylinder 12 are provided with electric solenoid controlled air-operated gate valves 14 and 14'. At a point just below the upper valve 14 there is provided a specially shaped takeoff line 19, which is designed so as to discourage the entry into the system of large or heavy pieces of metal or bones. Air jets supplied by air lines 17 and 17' provide agitation just above the top valve 14 as well as just above the bottom valve 14'. A suitable interlock (not shown) with the two gate valve operating cylinders 18 and 18' controls the diversion of agitation air to one or the other of these points.

Cylinder 12 is provided with a take-off pipe 19 (already mentioned) which is provided with a chain wheel operated gate valve 20. The take-off pipe conducts the slurry to a large stainless steel magnetic separator 21, and then a centrifugal solids handling slush pump 22 transfers the tankage and water through line 22B back to the slush box or through valve 22C and line 24 to the hammermill 23. Valve 22C, which is automatically controlled by the level in tank 30, operates intermittently to supply slurry to the hammermill 23. It has been discovered that intermittent fully open and closed operation of this valve is essential to prevent plugging by solids at this point. Partial opening to give constant flow would result in frequent plugging.

If the rendering tanks which were blown into the slush box have very high bone content, the largest and least cooked bones will collect on the top surface of the bottom gate valve 14'. Trash and iron will also collect here. When the build-up goes far enough to blind off the opening to pipe 19, the cylinder 12 can be emptied and the contents dumped into a suitable cart. This is accomplished by remote control from a control panel within sight of the outlet. Throwing the first switch shuts the top valve 14 and changes the air agitation from below to just above it. Throwing the second swich opens the bottom valve 14' and dumps out the trash and big bones through flanged extension 25. The second switch is then thrown the other way, closing the bottom valve 14', and the first switch is also reversed opening the top valve 14 and returning the agitation air to the lower position. This is accomplished in from 15 to 30 seconds. If either the magnetic trap or the slush pump have become clogged, they can be cleared at the same time. While the bottom valve is open, the operator closes valve 22D and then introduces twin streams of wash water in the trap and into the pump. This backwashes the solids out the line and into the cylinder from which they fall into a suitable receptacle or cart. Refuse and iron can be hand sorted from the receptacle or cart, and the few remaining bones can be dumped directly into the dryer at the end of the day's run. In actual practice, on yellow grease and white grease tanks (rendering tanks in which the poorest and second poorest grade of scraps respectively are cooked) the most the cylinder is dumped during the day's run is seven or eight times, and on some days it may not be dumped at all.

Continuing the description of the system, the slurry has now traveled past the slush pump 22. This pump forces the slurry at about 100 to 200 G. P. M. through line 24 to the hammermill 23, operated by a motor and belt drive 27, where the solids in the slurry are disintegrated to produce a homogeneous slurry having particles reduced in size to less than ¼ inch mean diameter. Any suitable disintegrating equipment may be used to produce the desired slurry. In actual practice a Steadman BX 12 x 15 hammermill with milled taper bars and swing hammers has been used. The importance in reducing particle size is related to the fact that in this process grease which is mechanically held within the meat particle is released, and the breakdown makes this easier to do in the subsequent centrifuging step. The slurry then falls into a tank 30 provided with a stirrer 34. Pump 31 is provided to feed the slurry through lines 32 and 33 back to the tank 30 in order to permit the build-up of a backlog of slurry before starting to feed the slurry through pump 31 and line 32 to centrifuge 40.

The recycling of the slurry in tank 30 is continued until the tank is about half full. Steam supplied by line 37 heats the contents of the tank to a temperature in the range of about 180° F. to about 212° F. The high temperature here makes it easier to flow both the water and fat out of the solids. The temperature is controlled by an automatic control element 39 which activates controller 39'. Controller 39' controls valve 37' in steam line 37. The recycle line 33 is then closed off after the feed to the centrifuge has been opened, and the slurry is fed by feed pump 31 at about 2400 G. P. H. to the centrifuge 40. From now on the level in the tank will oscillate, and be controlled by liquid level indicator and controller 36. Indicator 36 located in the tank actuates signal 38 and gives warning if the level should get too close to the top or too close to the bottom of the feed tank 30. It is found to be advantageous to utilize a high centrifugal force continuous solids discharge horizontal type centrifuge 40, such as shown in Figure 5 in an article by C. M. Ambler entitled "New Developments in Centrifuge Applications," vol. 44, "Chemical Engineering Progress," May 1948, pages 405–410, in order to get maximum grease recovery from the solids.

The liquid effluent from the centrifuge 40 flows by gravity to an effluent tank 41, from which it is pumped through line 47 by a positive displacement pump 42, controlled by a float switch 44 in the tank, to a suitable vibrating screen 45 actuated by a motor drive 48.

The solids from centrifuge 40 are discharged either into a suitable receptacle or dryer cart 43 which will take them to the dryer, or onto a continuous conveyor (not shown) which conveys them to a convenient storage point.

Between the time when a particle of tankage leaves the slush box 11, and when it is discharged from the centrifuge 40 ready for the dryer, only about 10 to 15 minutes have elapsed. The rapid processing of the tankage at the temperatures indicated is an important feature of this invention which reduces protein losses as will be discussed later.

The solids which are discharged by the vibrating screen 45 fall into a suitable receptacle or dryer cart, and although they are quite wet, they can be dumped directly into the dryer since they will be in such small quantity. The screen serves to remove floating particles larger than about .015" mean diameter which may pass through the centrifuge 40 and also serves to catch agglomerates and other dirt coming from holding tanks and pipe lines, in order to prevent clogging the fine nozzles of the centrifuge 70 subsequently used as will be described later.

The effluent liquid falls through the screen and into a heated tank 50. The tank is heated by steam supplied by line 60 to a temperature from about 200° F. to 212° F., and preferably from about 205° F. to about 210° F. The higher the temperature, up to the boiling point, the better the recovery of grease from the tankwater. The steam supply is controlled by valve 61 and controller element 62 which activates the controller 63. From this tank it is pumped by pump 51 at about 20 to 40 G. P. M. through line 52 to a head tank 53 which feeds the continuous, three-phase nozzle discharge type centrifuge 70 through line 59 at about 1,500 G. P. H. Continuous, three-phase nozzle-discharge centrifuges are well known in the art, for instance see Figure 3 of the article by C. M. Ambler, previously referred to. Other centrifuges referred to in this article might be used in practicing the invention, for example, the valve discharge centrifuge illustrated in Figure 4 of the said article or as disclosed in U. S. Patent 2,286,354. Other types of centrifuge constructions useful in carrying out the present invention at any stage as previously described will suggest themselves to persons skilled in the art upon becoming familiar with this invention.

The overflow from the head tank 53 is fed back by line 54 to the heated tank 50 through the screen and the overflow from this tank is fed by gravity through line 55 to a large storage tank 56 on the floor below. The tankwater from storage tank 56 can be fed by pump 57 and line 58 to the screen 45 as desired. The nozzle discharge type centrifuge 70 may be run at considerably less feed rate than the rest of the system in order that it can be kept running 24 hours per day. This avoids the necessity of cleaning the centrifuge 70 daily after each shut-down. Continuous operation is advantageous as it reduces labor costs. The fat from the continuous, three-phase, nozzle-discharge centrifuge 70 goes to grease discharge tank 75 from where it is fed by pump 76 to storage and the tankwater discharge from the nozzles and the ringdam is united and pumped to discharge tank 80 and then to the storage tank 90. From the storage tank 90 the tankwater is fed to a suitable evaporator.

The numerous advantages of the invention will be apparent from the foregoing description. By combining continuous material treatment and handling with simple integrated controls, the flow through the system is maintained with minimum of personnel.

Both liquids and solids are controlled at all times. By eliminating spillage, overflow, and "floor mess," appreciable savings are made possible, and objections from personnel are minimized. Since a closed system is provided which is continuous and rapid, it eliminates slop and spillage, and by preventing decomposition, it prevents the accompanying odors which plague the community. The tankage is processed in such a manner that solids are continuously discharged from the centrifuge, thereby eliminating the slow, manual press operation, cost of press cloths, and clean up. Press cloths rot and wear out rapidly. They cost between $6.00 and $7.00 each. Press cloth costs run as high as $5,000 per year in a single packing plant.

The process produces tankage with approximately 6% grease on a 6% moisture basis before blending with stick liquor and blood. By holding the grease content down to this desired percentage, thousands of pounds of grease which would otherwise be lost in the tankage are recovered and sold at grease prices. Higher percentages of grease are recovered from tankwater than are obtainable by previous methods and in many cases the grease is of higher quality. Grease which stays in tankage (9 to 10% on a dry basis in press tankage) is given away, since the tankage is sold on a purely protein analysis basis. By reducing grease loss in the tankage to 6% on a dry basis, the extra 3% of grease saved can be sold as such, instead of being given away in the tankage. Due to rapid handling and quick recovery, the grease is improved both with regard to free fatty acid and color. The proportion of protein available for animal nutrition is higher in quickly handled meat meal. Decomposition changes available protein into non-available protein quite rapidly. A better grade of stick, higher in protein, also results from quick handling of the tankage in the process. Because the process is essentially one having a short time continuous cycle, much protein is recovered that is lost in present slow methods because of decomposition and putrefraction. Tests have shown that from 20% to 40% of available protein is destroyed by this means. The savings resulting from recovery of varying amounts of protein are obvious since the time-temperature relationship established in the process makes it possible to recover maximum available protein in the solids.

The process also can be utilized for efficiently recovering grease from settling basin sludge, gut slimes, and tank-bottoms. Tank bottoms are the settlings in the bottom of grease, lard, or water holding tanks around the plant. Several times a month the tanks must be drained and the sludge in the bottom pumped out. These slushy fine solids, very high in fat, which cause so much difficulty in conventional pressing methods, can be handled with ease by this continuous process. Gut slimes are the linings from the intestines. They are squeezed out when it is intended to use the intestines as sausage casings. They are very high in protein, but are usually thrown away because they cannot be handled in a press. This process handles them easily. The settling basin is in the sewer line from the plant and is intended to trap grease and solids before they escape. These products are either recooked or settled and skimmed, and then the remainder is discarded. This process handles this unpressable product with ease.

The invention avoids the loss of valuable proteins which have been previously lost by putrefaction or decomposition. Long settling periods in the tanks with one batch waiting behind the other are also eliminated. The process continuously produces meal cake, recovers grease, and discharges tankwater with the material in process about 20 minutes total time. Significant reduction by the process in biological oxygen demand (B. O. D.) of sewage released to public waterways is also an important result achieved, since the organic matter is removed from the tankage liquors.

While in the foregoing particular description reference has been made to certain types of equipment, particularly with reference to the types of centrifuge employed, it is to be understood that any other type of equipment, including centrifuges, suitable for the purpose, or other suitable separation devices, may be employed or substituted.

Numerous changes and modifications may be made in connection with the apparatus and various operating conditions as herein described within the broad principles of the invention which are intended to be covered by the appended claims. Accordingly, it is to be understood that the above particular description is by way of illustration and not of limitation, and that changes, omissions, additions, substitutions and/or modifications may be made without departing from the spirit of the invention.

I claim:

1. The process of continuously treating slaughterhouse tankage and tankwater resulting from wet rendering in which fats are initially removed; to separate same into solids, fats and tankwater which comprises first separating any refuse, iron and unusually large bones from said tankage and tankwater, subjecting a slurry of said tankage and tankwater to the impact of surfaces moving at a high velocity to reduce the solids contained therein preponderantly to below a predetermined particle size, heating the disintegrated tankage solids in the form of said slurry in tankwater to at least 180° F., separating solids from said slurry by continuous centrifugation, recovering the tankwater, then continuously removing any remaining particles larger than .015" mean diameter from the separated tankwater, then heating the liquor to at least about 205° F., and then continuously separating fats from said liquor by centrifugation.

2. The process of continuously treating slaughterhouse tankage and tankwater resulting from wet rendering in which fats are initially removed; to separate same into solids, fats and tankwater which comprises first separating any refuse, iron and unusually large bones from the tankage and tankwater, subjecting a slurry of said tankage and tankwater to the impact of surfaces moving at a high velocity to reduce the solids contained therein preponderantly to below a predetermined particle size, heating the disintegrated solids in the form of said slurry in tankwater to at least 180° F., stirring and recycling the slurry while being heated to produce a homogeneous slurry, then separating solids from said slurry by continuous centrifugation, recovering the tankwater, then continuously removing any remaining particles larger than .015" mean diameter from the separated tankwater, then heating the tankwater to at least about 205° F., and continuously separating fats from said tankwater by centrifugation.

3. The process of continuously treating slaughterhouse tankage and tankwater resulting from wet rendering in which fats are initially removed; to separate solids, fats and tankwater which comprises separating bones, refuse and iron from the tankage and tankwater, subjecting a slurry of said tankage and tankwater to the impact of surfaces moving at a high velocity to reduce the solids contained therein to a predetermined particle size of under ¼" mean diameter, heating the disintegrated solids in the form of said slurry in tankwater to a temperature between about 180° F. and 212° F., separating solids from said slurry by continuous centrifugation, then continuously removing any remaining particles larger than .015" mean diameter from the separated tankwater, then heating the tankwater to a temperature between about 200° F. and 212° F., and continuously separating fats from said tankwater by centrifugation.

References Cited in the file of this patent

UNITED STATES PATENTS

| | | |
|---|---|---|
| 1,775,740 | Taylor et al. | Sept. 16, 1930 |
| 2,229,376 | Fauth et al. | Jan. 21, 1941 |
| 2,372,677 | Lassen | Apr. 3, 1945 |

FOREIGN PATENTS

| | | |
|---|---|---|
| 292,327 | Great Britain | June 22, 1928 |
| 340 | Lebanon | July 15, 1950 |
| 341 | Lebanon | July 15, 1950 |